United States Patent [19]

Endo et al.

[11] Patent Number: 4,527,160

[45] Date of Patent: Jul. 2, 1985

[54] DOPPLER RADAR TYPE SPEEDOMETER

[75] Inventors: Akira Endo, Katsuta; Katsuhiro Kimura, Tokyo, both of Japan

[73] Assignee: Hitachi, Ltd., Tokyo, Japan

[21] Appl. No.: 379,860

[22] Filed: May 19, 1982

[30] Foreign Application Priority Data

May 27, 1981 [JP] Japan .................................. 56-79338

[51] Int. Cl.³ .............................................. G01S 13/60
[52] U.S. Cl. ..................................... 343/8; 343/5 DP
[58] Field of Search ......... 343/8, 5 SA, 7 VM, 5 DP; 324/79 D, 78 D

[56] References Cited

U.S. PATENT DOCUMENTS

| | | | |
|---|---|---|---|
| 3,898,653 | 8/1975 | Ban et al. | 343/7 VM |
| 4,107,680 | 8/1978 | Kaplan | 343/8 |
| 4,319,245 | 3/1982 | Mawhinney | 343/8 |
| 4,335,383 | 6/1982 | Berry | 343/8 |
| 4,359,734 | 11/1982 | Bachman | 343/8 |

Primary Examiner—T. H. Tubbesing
Assistant Examiner—Gilberto Barrón, Jr.
Attorney, Agent, or Firm—Antonelli, Terry & Wands

[57] ABSTRACT

A Doppler radar type speedometer capable of speed detection without a detection error comprises a Doppler radar signal processing circuit which includes a random access memory. In the circuit, the levels "1" of Doppler radar pulses of individual frequencies are added to the contents of the random access memory which stores the resultant data therein, so that the pulse width can be detected which is provided by the number of levels "1" at the most significant bits of the results stored in the addresses corresponding to a n/2-th output pulse signal of a predetermined number n of output pulse signals arranged in order of pulse widths.

6 Claims, 8 Drawing Figures

DOPPLER RADAR TYPE SPEEDOMETER

This invention relates to a speedometer using a Doppler radar, and more particularly to a Doppler radar type speedometer capable of measuring the speed of a moving body without a detection error.

A Doppler radar type speedometer is generally so constructed that a Doppler radar is mounted on a moving body such as an automobile or a car of a train, and the radio beam from the Doppler radar is directed toward the ground at a selected predetermined angle of incidence with respect to the ground, so as to detect the speed of the vehicle relative to the ground utilizing the Doppler effect.

In a prior art Doppler radar type speedometer, the wave reflected in scattered relation from the ground is received by an antenna again after a Doppler frequency shift due to the motion of the vehicle relative to the ground. This Doppler frequency fd[Hz] is proportional to the vehicle speed v[m/s] and the cosine of the incidence angle $\theta$ (cos $\theta$) and is given by the following equation in relation to the wavelength $\lambda$[m]:

$$fd = (2v/\lambda) \cdot \cos \theta \quad (1)$$

A coupler connected to the single antenna is used in common for both of wave transmission and wave reception. A portion of the transmitted wave and the received wave are simultaneously applied to a mixer connected to the output of the coupler, and the beat produced due to the frequency difference between these two signals provides the Doppler signal. This Doppler signal is applied to a comparator after being amplified by an amplifier, and, in the comparator, the signal of level exceeding a predetermined threshold level determined by consideration of the signal-to-noise (S/N) ratio is converted into a pulse signal. This pulse frequency provides the Doppler frequency fd proportional to the vehicle speed v as described above. Therefore, when the number of pulses appearing from the comparator within a predetermined period of time is counted by a counter, the count is proportional to the vehicle speed v, and the value is displayed on a display unit.

Actually, however, the width of the beam transmitted from the antenna is finite, and the reflected beam from the ground surface is irregularly scattered. Consequently, the Doppler signal waveform includes a plurality of mixed Doppler frequencies and is analogous to narrow band noise rather than the sinusoidal waveform. Thus, this Doppler signal waveform is such that its center frequency is expressed by the equation (1), and the amplitude varies so greatly that the amplitude of its envelope is reduced to zero very frequently. Such a great amplitude variation occurs theoretically and is inevitable insofar as the beam transmitted from the antenna has the finite width. Processing of such a waveform by the aforementioned prior art processing circuit results necessarily in appearance of Doppler signal levels lower than the threshold level, and dropout of pulses at such low signal levels results. Consequently, the prior art Doppler radar type speedometer, which counts the number of pulses and displays the vehicle speed on the basis of the count, has been defective in that a detection error occurs necessarily.

A Doppler radar type speedometer for measuring, for example, the speed of an airplane relative to the ground is known, in which a pulse motor having large inertia is rotated by application of the Doppler signal, and the speed of the airplane is detected on the basis of the rotation speed of the pulse motor. However, such a speedometer is not readily applicable to a vehicle such as an automobile from the aspect of the large occupation space and also from the aspect of the cost. Recently, a proposal has been made in which a circuit called a PLL (A phase locked loop) composed of a phase comparator and a voltage-frequency converter is inserted between the detected Doppler pulse signal output terminal and the counter, so that this inserted circuit carries out integration effective for compensating for signal dropout. However, this proposal has also been defective in that dropout of pulses cannot be compensated when its percentage exceeds 10% of the total number of pulses.

It is therefore a primary object of the present invention to obviate all of the prior art defects pointed out above.

The Doppler radar type speedometer capable of speed detection with high accuracy, according to the present invention, is based on the experimental confirmation that a theoretical pulse width appears at a maximum frequency among various pulse widths of the Doppler pulse signal generated from the Doppler radar type speedometer, and the pulse widths are substantially symmetrically distributed on both sides of the theoretical pulse width, and is featured by the fact that the distribution of pulse widths is written in a memory in lieu of the prior art practice of counting the number of pulses, and the pulse width corresponding to the center of the pulse width distribution rate is detected to detect the vehicle speed with high accuracy.

Other objects, features and advantages of the present invention will become apparent from the following detailed description of preferred embodiments thereof taken in conjunction with the accompanying drawings, in which.

For a better understanding of the present invention, a prior art Doppler radar type speedometer will be described with reference to FIGS. 1 and 2 before describing the present invention in detail. Since the general operation of the prior art Doppler radar type speedometer has already been described, the structure thereof will only be described herein.

Figure 1:
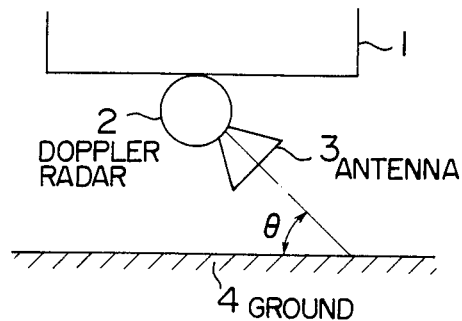
FIG. 1 shows the mounted condition of a Doppler radar type speedometer.
Figure 2:
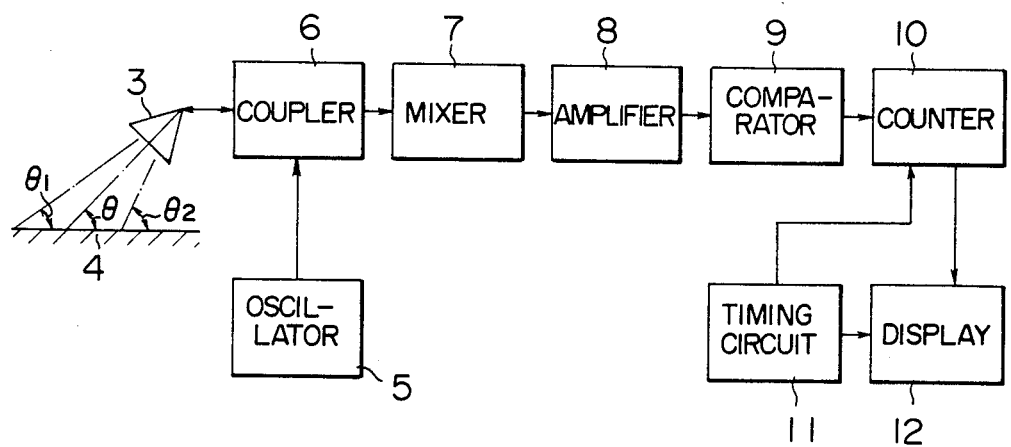
FIG. 2 is a circuit diagram showing the circuit structure of a prior art Doppler radar type speedometer.

Referring now to FIGS. 1 and 2, reference numerals 1, 2, 3 and 4 designate the body of a vehicle such as an automobile or a car of a train, a Doppler radar, an antenna, and ground respectively. The radio beam from the Doppler radar 2 is directed toward the ground 4 at a selected predetermined angle of incidence $\theta$. The antenna 3 transmitting the microwave toward the ground 4 is connected to a coupler 6. An oscillator 5 and a mixer 7 are connected to the coupler 6. A comparator 9 is connected to the mixer 7 through an amplifier 8. A counter 10 is connected to the comparator 9, and a timing circuit 11 and a display unit 12 are connected to the counter 10.

Figure 3:
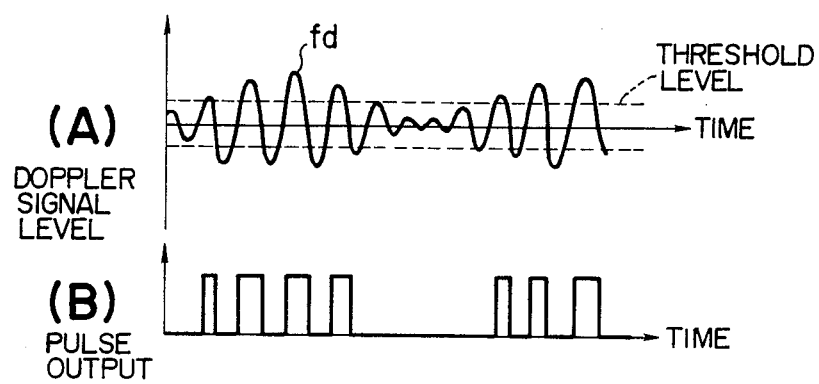
FIG. 3 shows the waveform of the output from the Doppler radar type speedometer shown in FIG. 2.

FIG. 3 shows the waveform of the output from the prior art Doppler radar type speedometer. As seen in FIG. 3(A), Doppler signal levels lower than a threshold level appear necessarily in the output from the amplifier 8, and, as a result, there occurs dropout of pulses corresponding to the Doppler signal levels lower than the threshold level, in the output from the comparator 9 as seen in FIG. 3(B). Therefore, a detection error occurs necessarily in the prior art Doppler radar type speedometer which displays the vehicle speed on the display unit 12 by counting the number of pulses by the counter 10.

Figure 4:
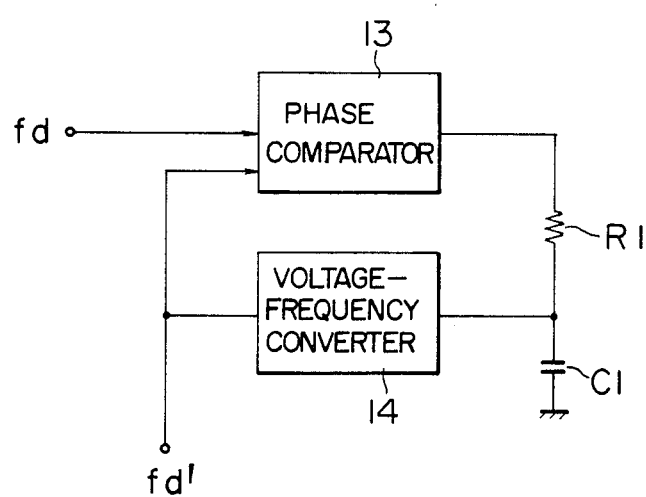
FIG. 4 is a circuit diagram of a prior art dropout compensation circuit using a PLL.

FIG. 4 shows the structure of a prior art pulse dropout compensation circuit using a PLL. As described already, a PLL circuit composed of a phase comparator 13 and a voltage-frequency converter 14 is inserted in the speedometer circuit so as to compensate for signal dropout by the integration effect of the PLL circuit. However, as also described already, the compensation circuit is no more effective when the percentage of pulse dropout exceeds 10%.

A preferred embodiment of the present invention will now be described with reference to FIG. 5.

Figure 5:
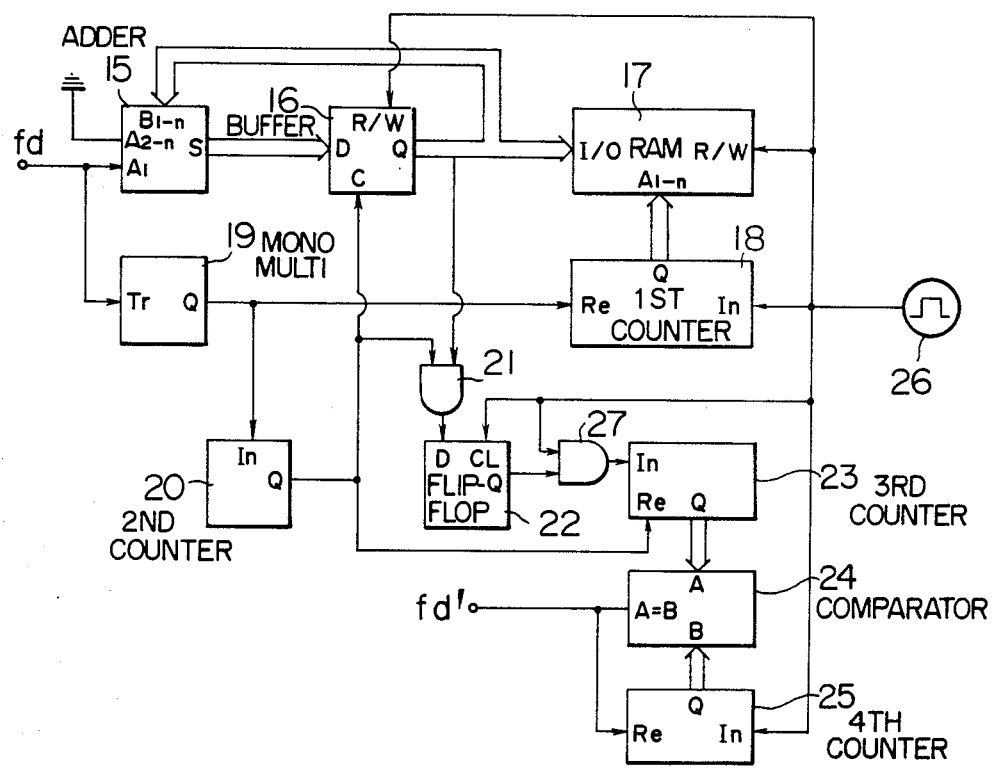
FIG. 5 is a circuit diagram showing the structure of a preferred embodiment of the present invention.

Referring to FIG. 5, a Doppler radar signal processing circuit is interposed or connected between the Doppler pulse output terminal of the comparator 9 and the counter 10 in the prior art structure shown in FIG. 2, according to the embodiment of the present invention.

In FIG. 5, the input to and the output from the Doppler radar signal processing circuit are designated by fd and fd', respectively. In the description which follows, a high pulse level and a low pulse level are indicated by "1" and "0", respectively.

Referring to FIG. 5, the pulse input signal fd is applied to the input terminal $A_1$ of an adder 15 and to the trigger terminal Tr of a monostable multivibrator 19. A buffer 16 is connected at its terminal D to the output terminal S of the adder 15, and the terminal I/O of a random access memory (referred to hereinafter as an RAM) 17 and the terminal $B_{1-n}$ of the adder 15 are connected to the terminal Q of the buffer 16.

The reset terminal Re of a first counter 18 and the input terminal In of a second counter 20 are connected to the terminal Q of the monostable multivibrator 19. The terminal $A_{1-n}$ of the RAM 17 is connected to the terminal Q of the first counter 18, and the clear terminal C of the buffer 16, one of the input terminals of an AND gate 21 and the reset terminal Re of a third counter 23 are connected to the terminal Q of the second counter 20. The output signal from the terminal Q of the buffer 16 is applied to the other input terminal of the first AND gate 21, and the output terminal of the AND gate 21 is connected to the terminal D of a flip-flop circuit 22. One of the input terminals of a second AND gate 27 is connected to the terminal Q of the flip-flop circuit 22. The oscillation output signal of predetermined frequency from an oscillator 26 is applied to the other input terminal of the second AND gate 27. The output terminal of this second AND gate 27 is connected to the input terminal In of the third counter 23. The terminal Q of this third counter 23 is connected to the terminal A of a comparator 24, and the terminal Q of a fourth counter 25 is connected to the terminal B of the comparator 24. The circuit output signal fd' appears from the output terminal A=B of the comparator 24, and the fourth counter 25 is reset by the signal fd' applied to its reset terminal Re.

The oscillation output signal of predetermined frequency from the oscillator 26 is also applied to the terminal R/W of the buffer 16, to the terminal R/W of the RAM 17, to the input terminal In of the first counter 18, to the clock terminal CL of the flip-flop circuit 22 and to the input terminal In of the fourth counter 25.

Figure 8:
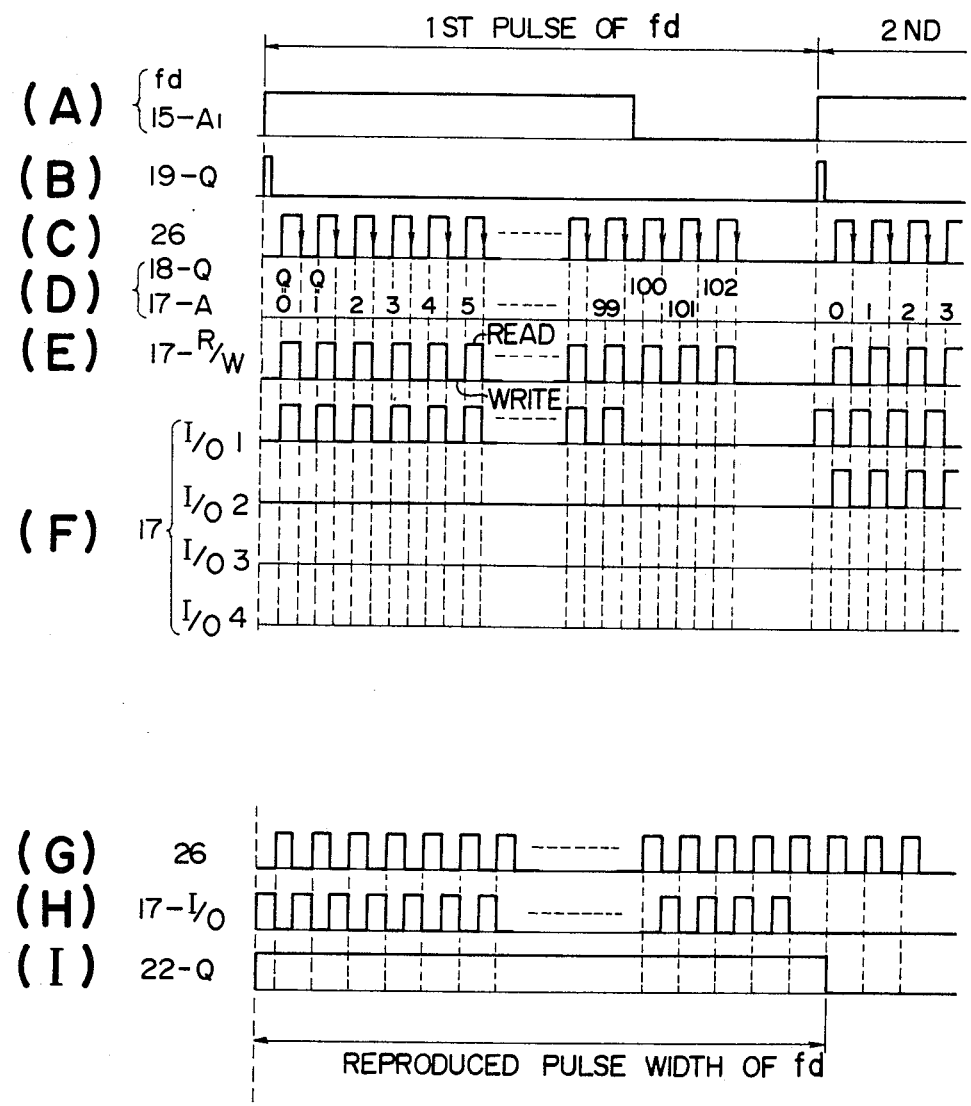
FIG. 8 is a time chart of operation of the embodiment of the present invention shown in FIG. 5.

In the Doppler radar signal processing circuit having the structure above described, a Doppler pulse input signal fd as shown in FIG. 8(A) is applied to the input terminal $A_1$ of the adder 15, and the output signal of the adder 15 is applied to and held in the buffer 16. The output signal of the buffer 16 is applied to and stored in the RAM 17, and the memory output signal of the RAM 17 is applied to another input terminal $B_{1-n}$ of the adder 15 to be added in the adder 15 to the pulse input signal fd. The Doppler pulse input signal fd is applied at the same time to the monostable multivibrator 19, and a pulse as shown in FIG. 8(B) appears from the monostable multivibrator 19 at the rise time of the pulse input signal fd to reset the first counter 18. This counter 18 continuously counts clock pulses, as shown in FIG. 8(C), applied from the oscillator 26, so that the count of this counter 18 specifies the memory address of the RAM 17. The second counter 20 counts the number of times the pulse signal shown in FIG. 8(B) is generated from the monostable multivibrator 19, and, when the count attains a setting n, a pulse appears from the terminal Q of this counter 20 to clear the buffer 16 and, at the same time, to reset the third counter 23. After the number of pulses applied from the monostable multivibrator 19 to the second counter 20 has attained the setting n, the digital data in the specified address of the RAM 17 passes through the first AND gate 21, so that this selected data is stored in the flip-flop circuit 22. When the output signal of "1" level appears from the flip-flop circuit 22 to be applied to the second AND gate 27, the third counter 23 starts to count the clock pulses applied from the oscillator 26. The fourth counter 25 continuously counts the clock pulses applied from the oscillator 26. The count of the third counter 23 is compared in the comparator 24 with that of the fourth counter 25. When the former coincides with the latter, the fourth counter 25 is reset by a clear signal, and this clear signal appears as an output pulse fd'.

The operation of this embodiment will be described in further detail. The circuit of the embodiment is broadly classified into three portions, that is, the portion detecting the true pulse width, the portion converting the pulse width into the corresponding frequency and the timing circuit portion.

Figure 6:
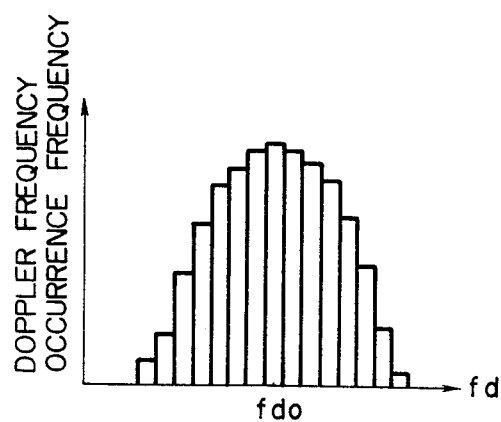
FIG. 6 is a graph showing the occurrence frequency of various Doppler frequencies.
Figure 7:
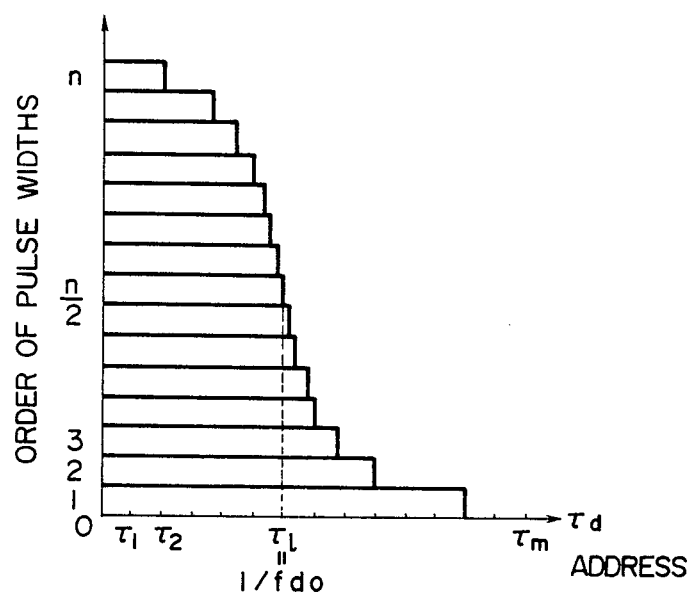
FIG. 7 illustrates the contents of a memory employed in the present invention.

Firstly, the circuit portion extracting the pulse width appearing at a maximum frequency from the Doppler pulse signal will be described. At the rise time of a pulse of the Doppler pulse signal fd shown in FIG. 8(A), a pulse as shown in FIG. 8(B) appears from the monostable multivibrator 19 to reset the first counter 18. Consequently, the addresses of the RAM 17 are set in the initial state. For convenience of explanation, the RAM 17 is supposed to have the capacity of (4 bits × 1 K) words herein. It is apparent, however, that the capacity of the RAM 17 can be designed as desired in practical applications. The read-write timing for the RAM 17 is such that the reading and writing operation is carried out as shown in FIG. 8(E) while the first counter 18 counts one of the clock pulses applied from the oscillator 26 with a pulse period as shown in FIG. 8(C). Suppose that the Doppler pulse signal fd of "1" level is applied in the initialized state of the RAM 17. When all of the contents of the RAM 17 are "O's" as shown in FIG. 8(F), all of the bits of a 4-bit data read out first from the RAM 17 are "O's", and the result of addition by the adder 15 is "1" since the Doppler pulse fd of "1" level is applied thereto. In FIG. 8(f), I/01, I/02, I/03, and I/04 represent, the least significant, the second significant, the third significant, and the most significant bit of the RAM 17. This result of addition is held in the buffer 16 and is then applied to the RAM 17 in the write mode so as to store such a 4-bit data in the first address of the RAM 17. Then, when the first counter 18 counts the next clock pulse, the count of the counter 18 increases by one, and a data indicative of "1" is similarly stored in the next address of the RAM 17. Such an operation continues until the next pulse of the Doppler pulse signal fd is applied. At the rise time of the next Doppler pulse fd, the first counter 18 is reset by the pulse applied from the monostable multivibrator 19, which pulse is shown in FIG. 8(B). From this time, addressing of the RAM 17 is started again. The data output signal read out then from the RAM 17 includes a "1" in the four bits, and the output of the adder 15 is now "2" since the level "1" provided by the Doppler pulse signal fd is added in the adder 15 to the level "1" provided by the output signal of the RAM 17. After such an operation is repeated n times (where n is the number of the Doppler pulses fd and is preferably 16 since the data is of 4 bits), the memory contents of the RAM 17 will be as shown in FIG. 7. That is, the memory contents are representative of the distribution of n Doppler pulse signals arranged in order of pulse width. Since one read-write time is determined by the period of the clock pulses applied from the oscillator 26, the pulse width of the Doppler pulse signal fd is known from the number of "1"s stored in corresponding bit positions of the contents stored in the addresses each storing 4-bit data. FIG. 6 shows the experimental results of measurement of the frequency of occurrence of various Doppler frequencies of the Doppler pulse signal fd. It will be seen from FIG. 6 that that occurring with the maximum frequency is preferably selected as the Doppler frequency, that is, the signal applied to the I/0 4 which is the terminal of the most significant bit of the RAM 17, as shown in FIG. 8(H) is preferably selected, so that a reproduced pulse width of the signal fd as shown in FIG. 8(I) can be obtained. FIG. 7 showing the distribution of the pulse widths which are the reciprocal of the Doppler frequencies teaches that the Doppler frequency occurring with the maximum frequency corresponds to the n/2-th pulse width in the pulse width distribution of n pulse widths. Naturally, the greater the value of n, the better is the accuracy, according to the distribution of the pulse widths. It has been experimentally confirmed that the accuracy can be improved to about ±2% when n=64 and to about ±1% when n=128 in contrast to the prior art processing of the Doppler pulse signal in which the dropout rate is as high as about 20%.

It will be seen from the above description that, among all the contents stored in the RAM 17 after n pulses of the Doppler pulse signal fd have been counted, the contents which correspond to the pulse width located at the center or the n/2-th point in the pulse width distribution of the n pulses stored in the RAM 17 provide the desired pulse width, that is, the number of "1"s at the most significant bit of the contents stored at the addresses of the RAM 17 represent the desired pulse width because binary notation is used. In the circuit shown in FIG. 5, an output signal is derived from the most significant bit position of the RAM 17, in timed relation with the clock pulses (FIG. 8(G)) applied from the oscillator 26, from the starting stage of speed detection to read out the contents of the RAM 17. The length of time during which the signal read out from the most significant bit position of the RAM 17 continues to be "1" represents the pulse width. This signal is shaped by the flip-flop 22 to open the second AND gate 27 connected to the third counter 23 during the period of the pulse width, so that the third counter 23 counts the clock pulses applied from the oscillator 26 during this period of time.

The combination of the comparator 24 and the fourth counter 25 acts to convert the pulse width into the corresponding frequency. The operation of the circuit portion converting the pulse width into the frequency is such that the data held in the third counter 23 is compared in the comparator 24 with the data held in the fourth counter 25 counting up the same clock pulses as those counted by the third counter 23, and the fourth counter 25 is reset when the period of time counted by the third counter 23 is equal to that counted by the fourth counter 25. In this manner, the fourth counter 25 is repeatedly reset to provide a train of pulses whose frequency is the reciprocal of the detected pulse width.

The steps above described constitute one cycle, and the contents of the RAM 17 and third counter 23 are cleared after processing on n pulses of the Doppler pulse signal fd.

While the manner of processing with the wired logic has been described by way of example, similar processing can naturally be executed by a microcomputer, inasmuch as the processing is based on the holding of pulses, addition and division.

Therefore, according to the aforementioned embodiment of the present invention, a processing circuit of simple structure can analyze the frequency of appearance of various pulse widths in response to the application of a Doppler pulse output signal of a Doppler radar type speedometer in which dropout of pulses is inevitable, so that the vehicle speed can be detected with high accuracy.

It will be understood from the foregoing detailed description that the speed of a vehicle can be detected with high accuracy according to the present invention.

What is claimed is:
1. A Doppler radar type speedometer comprising:
 (a) a Doppler radar mounted on a moving body for transmitting microwaves of predetermined frequency and for receiving part of the waves reflected from the ground;
 (b) first means for amplifying and shaping the waveform of said received waves to provide a train of output pulse signals of various pulse widths and of level "1", a rise time point of each of said output pulse signals being used as a reference time point;
 (c) second means for adding levels of a predetermined number n of said output pulse signals at each time point determined by the number of predetermined time intervals starting from said reference time point;

(d) third means including a random access memory for storing each result of addition of the levels at each time point in an address thereof corresponding to each time point;

(e) fourth means for counting the number of the levels "1" at the most significant bits of said addition results stored at said addresses to thereby detect the pulse width of an output pulse signal corresponding to a n/2-th output pulse signal of said predetermined number n of the output pulse signals arranged in order of pulse widths; and (f) fifth means for displaying the speed of the moving body on the basis of the pulse width detected by said fourth means.

2. A Doppler radar type speedometer as claimed in claim 1, wherein said first means comprises an amplifier amplifying said received waves and a first comparator shaping the waveforms of the output signals of said amplifier and generating the output pulse signals.

3. A Doppler radar type speedometer as claimed in claim 2, wherein said second means comprises an adder, a monostable multivibrator, a buffer, a first counter and a second counter, said monostable multivibrator generating an output pulse at the rise time of each output signal from said first comparator, said first counter continuously counting clock pulses applied from an external oscillator except that it is reset by the output pulse applied from said monostable multivibrator thereby controlling said adder so that the level "1" of each output signal is added to the contents of each address of said third means for said predetermined number n of the output pulse signals from said first comparator, said address being determined by the count values of said first cuunter starting from said output pulse applied from said monostable multivibrator, each result of addition by said adder being temporarily stored in said buffer so that the contents of a corresponding address is updated by each addition result, said second counter counting the output pulses from said monostable multivibrator and upon attainment of a predetermined count clearing said buffer.

4. A Doppler radar type speedometer as claimed in claim 3, wherein said random access memory has a memory size with a bit number which determines said predetermined number n and stores each addition result from said buffer in an address specified by the output signal from said first counter each time such a signal is applied from said buffer.

5. A Doppler radar type speedometer as claimed in claim 4, wherein said fourth means comprises a first AND gate, a second AND gate, a flip-flop circuit, a third counter, a fourth counter and a second comparator, said second counter resetting said third counter after having counted said predetermined number n and opening said first AND gate through which the output signal of "1" level from said random access memory is applied to said flip-flop circuit from which an output signal of "1" level appears to open said second AND gate, so that, during the period of time in which the output signal of said random access memory continues to be in its "1" level, said third counter counts the clock pulses from said external oscillator and applies its count output signal to a first input of said second comparator, and said fourth counter counts the clock pulses from said external oscillator and applies its count output signal to a second input of said second comparator, said second comparator generating its output signal resetting said fourth counter when coincidence is reached between the counts of said third and fourth counters applied to said first and second inputs thereof.

6. A Doppler radar type speedometer as claimed in claim 5, wherein said fifth means comprises a fifth counter, a timing circuit and a display unit, said fifth counter counting for a predetermined period of time the pulses of the output pulse signal from said second comparator in response to the output signal from said timing circuit, said display unit displaying the output signal of said fifth counter as the value indicative of the speed of the moving body.

* * * * *